US009652407B2

United States Patent
Cheng

(10) Patent No.: US 9,652,407 B2
(45) Date of Patent: May 16, 2017

(54) METHOD FOR PROCESSING ERROR DIRECTORY OF NODE IN CC-NUMA SYSTEM, AND NODE

(71) Applicant: Huawei Technologies Co., Ltd., Shenzhen (CN)

(72) Inventor: Yongbo Cheng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 14/746,391

(22) Filed: Jun. 22, 2015

(65) Prior Publication Data

US 2015/0370712 A1 Dec. 24, 2015

(30) Foreign Application Priority Data

Jun. 24, 2014 (CN) .......................... 2014 1 0289296

(51) Int. Cl.
*G06F 12/08* (2016.01)
*G06F 12/12* (2016.01)
(Continued)

(52) U.S. Cl.
CPC ............ *G06F 12/128* (2013.01); *G06F 11/10* (2013.01); *G06F 12/0826* (2013.01);
(Continued)

(58) Field of Classification Search
CPC ............... G06F 12/0828; G06F 12/084; G06F 11/0724; G06F 12/0804; G06F 12/0808;
(Continued)

(56) References Cited

U.S. PATENT DOCUMENTS 7,171,594 B2 1/2007 Wyatt et al.
7,475,321 B2 1/2009 Gurumurthi et al.
(Continued)

FOREIGN PATENT DOCUMENTS

CN 101211289 A 7/2008
CN 102681930 A 9/2012
(Continued)

OTHER PUBLICATIONS

Jin, "The study on fault containment technology of CC-NUMA computer," Journal of Changchun University, vol. 18, Issue 6, pp. 28-30 (Dec. 2008).
(Continued)

*Primary Examiner* — Mark Giardino, Jr.
*Assistant Examiner* — Edward Waddy, Jr.
(74) *Attorney, Agent, or Firm* — Leydig, Voit & Mayer, Ltd.

(57) ABSTRACT

A method for processing an error directory of a node in a cache coherence non-uniform memory access (CC-NUMA) system and a node are provided. The method effectively reduces a possibility of a breakdown of the system caused by accumulation of the error bits in the directory memory of the CC-NUMA system. The method comprises: when a quantity of bits of a correctable error of a directory stored in a directory memory of the node is greater than a preset threshold, controlling all processors in the CC-NUMA system to write dirty data in a corresponding cache back to a corresponding main memory, flush the dirty data, and directly flush clean data in the corresponding cache; and controlling the CC-NUMA system to enter a quiescent state, clearing a record stored in the directory memory to zero, and controlling, after the zero clearing is completed, the CC-NUMA system to exit the quiescent state.

10 Claims, 2 Drawing Sheets

(51) Int. Cl.
*G06F 12/128* (2016.01)
*G06F 11/10* (2006.01)
*G06F 12/0817* (2016.01)
*G06F 12/0813* (2016.01)
*G06F 12/121* (2016.01)

(52) U.S. Cl.
CPC ...... *G06F 12/0813* (2013.01); *G06F 12/0828* (2013.01); *G06F 12/121* (2013.01); *G06F 2212/2542* (2013.01); *G06F 2212/62* (2013.01); *G06F 2212/69* (2013.01)

(58) Field of Classification Search
CPC .............. G06F 11/0709; G06F 11/076; G06F 11/0772; G06F 11/1048; G06F 12/0817; G06F 12/082; G06F 2212/2542; H04L 29/14
USPC ................. 711/E12.032, 141, E12.038, 144, 711/E12.037, E12.04, 147, 119, 121, 130, 711/143, 152, E12.026, 135
See application file for complete search history.

(56) References Cited

U.S. PATENT DOCUMENTS

2008/0155553 A1    6/2008  Astigarraga et al.
2013/0170334 A1*   7/2013  Koinuma ............ G06F 11/0724
                                                    370/216

FOREIGN PATENT DOCUMENTS

| CN | 103218275 | 7/2013 |
| CN | 103544269 | 1/2014 |
| CN | 104077375 A | 10/2014 |

OTHER PUBLICATIONS

Office Action in corresponding Chinese Patent Application No. 201410289296.3 (Dec. 23, 2016).

* cited by examiner

METHOD FOR PROCESSING ERROR DIRECTORY OF NODE IN CC-NUMA SYSTEM, AND NODE

CROSS-REFERENCE TO RELATED APPLICATION

This application claims priority to Chinese Patent Application No. 201410289296.3, filed on Jun. 24, 2014, which is hereby incorporated by reference in its entirety.

TECHNICAL FIELD

The present invention relates to the field of computer technologies, and in particular, to a method for processing an error directory of a node in a Cache Coherence Non-Uniform Memory Access (CC-NUMA) system, and a node.

BACKGROUND

In a CC-NUMA system built by high performance processors, due to a limited extension capability of the processors themselves, the processors need to be grouped into multiple nodes, and multiprocessor extension is performed by using a node controller (NC), so as to increase a quantity of parallel processing processors, thereby improving performance of the CC-NUMA system.

At present, a high performance processor used in a CC-NUMA system usually has a large-capacity memory extension capability and a relatively large-capacity cache, and can perform memory extension. All processors on each node can perform coherent access to memory of other processors in the CC-NUMA system, so that a directory is designed on each code to record a situation in which data in the node is cached by a processor in another node in the CC-NUMA system except the node, where the situation includes a state of the data and a position of the processor that accesses the data, where the state of the data includes shared or exclusive.

Generally, in NC design, a directory is implemented by using a relatively large-capacity memory. However, a random error, including a read error or write error, which is caused due to an interference factor, exists in the memory. Therefore, error check needs to be performed on a directory memory. An error correction code (ECC) for single error correction and double error detection is frequently used for error processing, that is, a one-bit error can be corrected, and a two-bit error can be detected. However, this error processing method has a problem that multiple bit errors are uncorrectable and undetectable, and if an error in directory data is unrecoverable, an error in cache coherence processing is caused, that is, an error occurs during memory access, which makes the data processing of the entire CC-NUMA system erroneous and causes a breakdown of the CC-NUMA system. In addition, a single-bit error may also change into a multi-bit error over time, which may also make the CC-NUMA system unavailable.

SUMMARY

Embodiments of the present invention provide a method for processing an error directory of a node in a CC-NUMA system, and a node, which can flush error bits that may exist in a directory memory, without resetting the CC-NUMA system, thereby effectively reducing a possibility of a breakdown of the CC-NUMA system caused by accumulation of the error bits in the directory memory of the CC-NUMA system.

To achieve the foregoing objective, the embodiments of the present invention use the following technical solutions:

According to a first aspect, a method for processing an error directory of a node in a CC-NUMA system is provided, including:

when a quantity of bits of a correctable error of a directory stored in a directory memory of the node is greater than a preset threshold, controlling all processors in the CC-NUMA system to write dirty data in a corresponding cache back to a corresponding main memory, flush the dirty data, and directly flush clean data in the corresponding cache;

controlling the CC-NUMA system to enter a quiescent state, where the quiescent state is used to indicate that none of the processors in the CC-NUMA system sends a request to the directory memory, and all the processors receive responses to all requests that have been sent; and clearing a record stored in the directory memory to zero, and controlling, after the zero clearing is completed, the CC-NUMA system to exit the quiescent state.

With reference to the first aspect, in a first possible implementation manner of the first aspect, the method further includes:

acquiring the quantity of the bits of the correctable error from a correctable error calculator of the node; and comparing the acquired quantity of the bits of the correctable error with the preset threshold.

With reference to the first aspect or the first possible implementation manner of the first aspect, in a second possible implementation manner of the first aspect, the controlling all processors in the CC-NUMA system to write dirty data in a corresponding cache back to a corresponding main memory, flush the dirty data, and directly flush clean data in the corresponding cache includes:

sending an interrupt instruction to the CC-NUMA system by using an operating system, where the interrupt instruction is used to instruct all the processors in the CC-NUMA system to write the dirty data in the corresponding cache back to the corresponding main memory, flush the dirty data, and directly flush the clean data in the corresponding cache.

With reference to the second possible implementation manner of the first aspect, in a third possible implementation manner of the first aspect, the controlling the CC-NUMA system to enter a quiescent state includes:

sending a pause instruction to the CC-NUMA system by using the operating system, where the pause instruction is used to instruct the CC-NUMA system to enter the quiescent state.

With reference to any possible manner of the first aspect to the third possible implementation manner of the first aspect, in a fourth possible implementation manner of the first aspect, the preset threshold is inversely proportional to a failure rate of the directory memory, where the failure rate of the directory memory refers to a proportion of error bits in the directory stored in the directory memory within a preset time range.

According to a second aspect, a node in a cache coherence non-uniform memory access CC-NUMA system is provided, including:

a directory memory, configured to store a record that data in the node is cached by a processor in another node in the CC-NUMA system except the node; and a node controller, configured to: when a quantity of bits of a correctable error of a directory stored in the directory memory is greater than a preset threshold, control all processors in the CC-NUMA system to write dirty data in a corresponding cache back to a corresponding main memory, flush the dirty data, and directly flush clean data in the corresponding cache, where the node controller is further configured to control the CC-NUMA system to enter a quiescent state, where the quiescent state is used to indicate that none of the processors in the CC-NUMA system sends a request to the directory memory, and all the processors receive responses to all requests that have been sent; and the node controller is configured to clear the record stored in the directory memory to zero, and control, after the zero clearing is completed, the CC-NUMA system to exit the quiescent state.

With reference to the second aspect, in a first possible implementation manner of the second aspect, the node further includes:

a correctable error calculator, configured to calculate the quantity of the bits of the correctable error of the directory stored in the directory memory, where the node controller is further configured to acquire the quantity of the bits of the correctable error from the correctable error calculator, and compare the acquired quantity of the bits of the correctable error with the preset threshold.

With reference to the second aspect or the first possible implementation manner of the second aspect, in a second possible implementation manner of the second aspect, the node controller is specifically configured to:

when the quantity of the bits of the correctable error of the directory stored in the directory memory is greater than the preset threshold, send an interrupt instruction to the CC-NUMA system by using an operating system, where the interrupt instruction is used to instruct all the processors in the CC-NUMA system to write the dirty data in the corresponding cache back to the corresponding main memory, flush the dirty data, and directly flush the clean data in the corresponding cache.

With reference to the second possible implementation manner of the second aspect, in a third possible implementation manner of the second aspect, the node controller is specifically configured to:

after the interrupt instruction is sent to the CC-NUMA system by using the operating system, send a pause instruction to the CC-NUMA system by using the operating system, where the pause instruction is used to instruct the CC-NUMA system to enter the quiescent state.

With reference to any one of the second aspect to the third possible implementation manner of the second aspect, in a fourth possible implementation manner of the second aspect, the preset threshold is inversely proportional to a failure rate of the directory memory, where the failure rate of the directory memory refers to a proportion of error bits in the directory stored in the directory memory within a preset time range.

Embodiments of the present invention provide a method for processing an error directory of a node in a CC-NUMA system, and a node. When a quantity of bits of a correctable error of a directory stored in a directory memory of the node is greater than a preset threshold, all processors in the CC-NUMA system are controlled to write dirty data in a corresponding cache back to a corresponding main memory, flush the dirty data, and directly flush clean data in the corresponding cache; and then, the CC-NUMA system is controlled to enter a quiescent state, a record stored in the directory memory is cleared to zero, and after the zero clearing is completed, the CC-NUMA system is controlled to exit the quiescent state. The processing method can flush error bits available in the directory memory without resetting the CC-NUMA system, thereby effectively reducing a possibility of a breakdown of the CC-NUMA system caused by accumulation of the error bits in the directory memory of the CC-NUMA system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
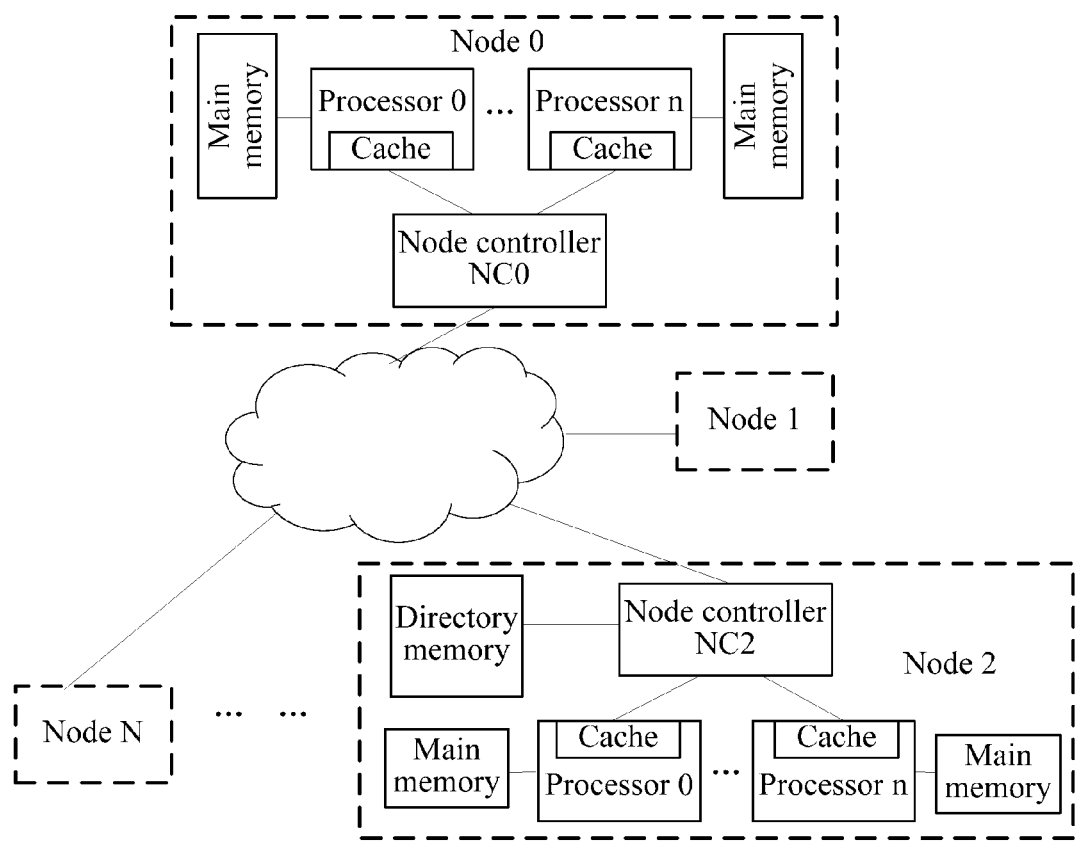
FIG. 1 is a schematic structural diagram of a CC-NUMA system according to an embodiment of the present invention.

A CC-NUMA system built by high performance processors can solve problems about scalability and programmability of a parallel processing system. Due to a limited extension capability of processors themselves, the processors are grouped into multiple nodes, and multiprocessor extension is performed by using an NC node controller, so as to increase a quantity of parallel processing processors, and improve performance of the CC-NUMA system. A simple CC-NUMA system may be shown in FIG. 1. As shown by a node Node0, in each node, there are two or more processors, which form a small node, and extension is performed between nodes by using an NC node controller.

Each processor has its own Cache, and can perform memory extension, and all processors on each node can perform coherent access to memory of all processors in the CC-NUMA system. Therefore, a directory is designed on the NC, and for cross-node data access, is used to record a state and a position of data to maintain coherence of the data. For example, a processor in node 0 caches data in a memory of a processor in node 2; then, an NC in node 2 needs to indicate, by using a directory record, that this data is cached by node 0, and mark a state of the data as shared or exclusive. Directories in the NC are all implemented by using relatively large-capacity memories, but the memories have a problem about bits of a correctable error or bits of an uncorrectable error, which may cause a breakdown of the CC-NUMA system over time.

Figure 2:
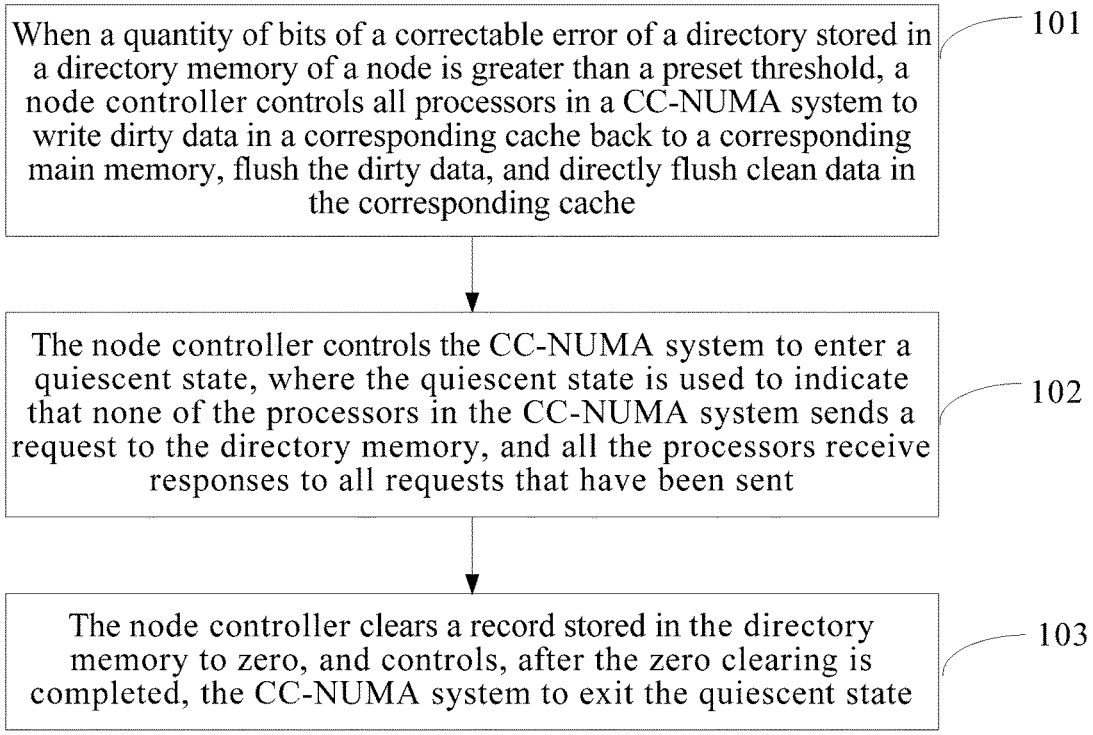
FIG. 2 is a schematic flowchart of a method for processing an error directory of a node in a CC-NUMA system according to an embodiment of the present invention.

An embodiment of the present invention provides a method for processing an error directory of a node in a CC-NUMA system. As shown in FIG. 2, the embodiment specifically includes:

Step 101. When a quantity of bits of a correctable error of a directory stored in a directory memory of the node is greater than a preset threshold, a node controller controls all processors in the CC-NUMA system to write dirty data in a corresponding cache back to a corresponding main memory, flush the dirty data, and directly flush clean data in the corresponding cache.

Step 102. The node controller controls the CC-NUMA system to enter a quiescent state, where the quiescent state is used to indicate that none of the processors in the CC-NUMA system sends a request to the directory memory, and all the processors receive responses to all requests that have been sent.

Step 103. The node controller clears a record stored in the directory memory to zero, and controls, after the zero clearing is completed, the CC-NUMA system to exit the quiescent state.

The directory memory may be on or off a chip of the NC node controller, and record a state and a vector of data in a node which is cached in another remote node in the CC-NUMA system except this node. When it is detected by using error detection that an error occurs in the directory memory, a correctable error calculator disposed in the directory memory may collect statistics on the quantity of the bits of the correctable error.

Exemplarily, when an error is checked by using an ECC, an ECC code encrypted by using data may be stored at an additional bit on a data bit. When data is written into the directory memory, a corresponding ECC code is saved at the same time. When the data just stored is read back, the saved ECC code is compared with an ECC code generated when the data is read; and if the two codes are different, the two codes are decoded, to determine that the data bit is erroneous. Then, it is determined whether the error of the bit is correctable; if the bit is a correctable error bit, the bitis marked with a mark of correctable, and if the bit is an uncorrectable error bit, the bitis marked with a mark of uncorrectable. In this way, the correctable error calculator in the directory memory collects statistics on marks of correctable within a preset time period, to obtain a quantity of bits of a correctable error. Herein, the preset time period may be an hour, or may be another value, which is not limited herein.

In this way, before step 101, after the node controller NC acquires the quantity of the bits of the correctable error from the correctable error calculator of the node, the node controller NC compares the acquired quantity of the bits of the correctable error with the preset threshold, and when it is determined that the quantity of the bits of the correctable error of the directory stored in the directory memory is greater than the preset threshold, sends an interrupt instruction to the CC-NUMA system by using an operating system, where the interrupt instruction is used to instruct all the processors in the CC-NUMA system to write the dirty data in the corresponding cache back to the corresponding main memory, flush the dirty data, and directly flush the clean data in the corresponding cache; or after the correctable error calculator acquires the quantity of the bits of the correctable error, the correctable error calculator compares the acquired quantity of the bits of the correctable error with the preset threshold, and when the correctable error calculator determines that the quantity of the bits of the correctable error is greater than the preset threshold, sends a notification message to the node controller, so as to notify the node controller to send an interrupt instruction to the CC-NUMA system by using an operating system.

A specific implementation manner of step 101 may be that: the node controller NC reports an interrupt request to the operating system of this node, to start a directory error flushing processing procedure, and then sends the interrupt instruction to all the processors in the CC-NUMA system by using the operating system of this node, so that all the processors flush data in processor caches. The data in the processor caches includes dirty data and clean data. The dirty data refers to a readable and writable copy of data in the main memory corresponding to the processor. Because the readable and writable copy is newer than an original in the main memory, the readable and writable copy needs to be written back into the main memory before the dirty data is flushed. The clean data refers to a read-only copy of the data in the main memory corresponding to the processor, and the clean data may be directly flushed without needing to be written back into the main memory.

Herein, data in all the processor caches is flushed, to ensure cache coherence of the CC-NUMA system. For example, it is assumed that a processor of node 0 accesses most recently modified data 1' in node 2, where a directory of the modified data 1' is stored in a directory memory in node 2, so that the required modified data 1' can be obtained according to the directory of node 2. If a quantity of bits of a correctable error in the directory memory of node 2 exceed a preset threshold, a zero clearing operation is performed on the directory memory of node 2 in step 103, and the modified data 1' in a processor cache of node 2 is not written back into a main memory, so that the processor of node 0 regards that the recently modified data 1' to be acquired does not exist in the processor cache of node 2 and is not stored in the main memory corresponding to the node 2 either, and then node 0 retains previously obtained data 1, and cannot read the most recently modified data 1'. For the access to node 0, the most recently modified data cannot be obtained, and a data coherence error will occur. For example, when it is applied to a railway ministry ticketing system, when a processor of a window cannot acquire most recently ticketing situations of other ticketing windows in time, ticketing data will be incoherent, causing the ticketing data to be disordered.

Data coherence usually refers to whether a logical relationship between associated data is correct and complete. In the CC-NUMA system, a processor of each node can perform coherent access to processors of other nodes in the CC-NUMA system, so as to ensure that each processor can obtain most recently modified data of the processors of the other nodes at any time, thereby maintaining the data coherence. Therefore, when a problem occurs in a directory memory of a node in the system, data in all the processor caches of the entire CC-NUMA system needs to be flushed, so as to ensure the data coherence of the CC-NUMA system.

In this way, if the quantity of the bits of the correctable error of the directory memory in node 2 exceeds the preset threshold, because the directory of the directory memory in node 2 stores a record that data in node 2 is cached by a processor in a node in the CC-NUMA system except node 2, when data in all the processor caches is flushed, information in directory entries in the directory memory of node 2 is all redundant, and becomes invalid information.

The preset threshold is inversely proportional to a failure rate of the directory memory, where the failure rate of the directory memory refers to a proportion of error bits in the directory stored in the directory memory within a preset time range.

After the operating system flushes all the data in all the processor caches by using step 101, in step 102, the operating system sends a pause instruction to all the processors, so that none of the processors in the node sends a request to the directory memory of this node, and all the processors receive responses to all requests that have been sent, to make the CC-NUMA system enter the quiescent state.

Herein the processors are paused to make the CC-NUMA system be in the quiescent state. This is because before step 103 is executed to perform a zero clearing operation on the directory memory, the processors do not send an instruction used for modifying the directory of the directory memory to the directory memory, to ensure that the directory of the directory memory does not change any more.

Then, step 103 is executed. The record stored in the directory memory is cleared to zero, and after the zero clearing is completed, the CC-NUMA system is controlled to exit the quiescent state.

Specifically, after the CC-NUMA system enters the quiescent state, the zero clearing operation is performed on the record stored in the directory memory in the NC, so that all information in the directory memory is flushed. Then, the node in which a directory flush is performed sends a recovery instruction to all the processors of the CC-NUMA system by using the operating system, to control all the processors to keep running and the CC-NUMA system to exit the quiescent state.

In addition, in the foregoing method procedure, in order to prevent unrecognized error bits from causing a severe error over time, information in the directory memory may be cleared to zero in advance, and in the process, a system reboot is not needed. In addition, the processor cache is generally only about 30 MB, and time needed by the processor cache to write back the data and time needed by the processor cache to clear the directory memory to zero are both in the magnitude order of ms. In this case, a short time can be used to prevent a possibility of a breakdown of the CC-NUMA system caused by accumulation of errors.

This embodiment of the present invention provides a method for processing an error directory of a node in a CC-NUMA system. When a quantity of bits of a correctable error of a directory stored in a directory memory of the node is greater than a preset threshold, all processors in the CC-NUMA system are controlled to write dirty data in a corresponding cache back to a corresponding main memory, flush the dirty data, and directly flush clean data in the corresponding cache; and then, the CC-NUMA system is controlled to enter a quiescent state, a record stored in the directory memory is cleared to zero, and after the zero clearing is completed, the CC-NUMA system is controlled to exit the quiescent state. The processing method can flush error bits available in the directory memory without resetting the CC-NUMA system, thereby effectively reducing a possibility of a breakdown of the CC-NUMA system caused by accumulation of the error bits in the directory memory of the CC-NUMA system.

Figure 3:
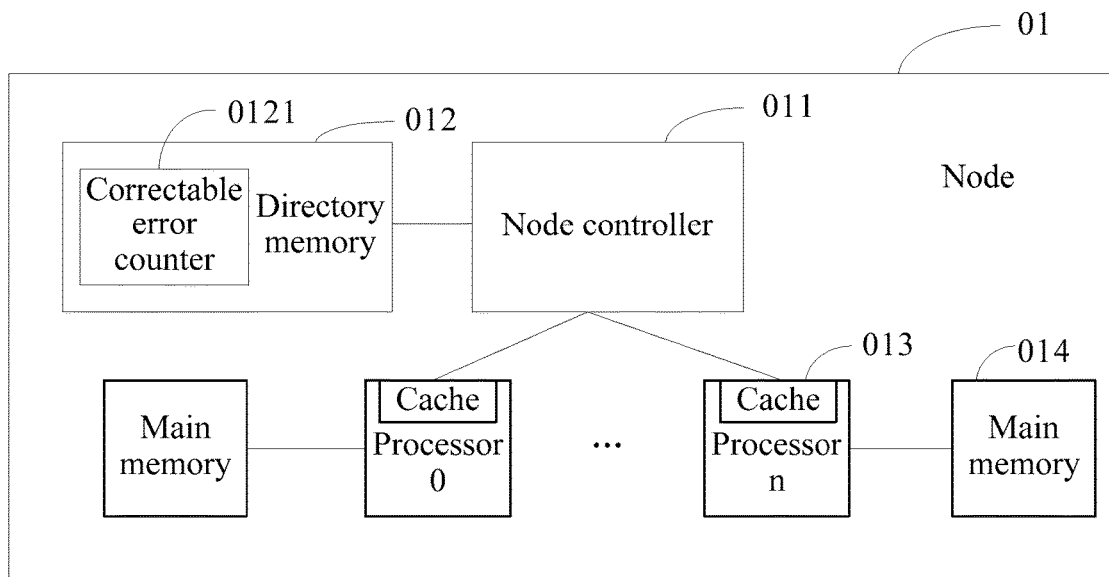
FIG. 3 is a schematic structural diagram of a node according to an embodiment of the present invention.

An embodiment of the present invention provides a node 01 in a CC-NUMA system, including a main memory 014. As shown in FIG. 3, the node 01 further includes a node controller 011, a directory memory 012, and a processor 013, where the directory memory 012 includes a correctable error calculator 0121.

The directory memory 012 is configured to store a record that data in the node is cached by a processor in another node in the CC-NUMA system except the node.

The node controller 011 is configured to: when a quantity of bits of a correctable error of a directory stored in the directory memory 012 is greater than a preset threshold, control all processors in the CC-NUMA system to write dirty data in a corresponding cache back to a corresponding main memory, flush the dirty data, and directly flush clean data in the corresponding cache, where the preset threshold is inversely proportional to a failure rate of the directory memory 012, and the failure rate of the directory memory 012 refers to a proportion of error bits in the directory stored in the directory memory 012 within a preset time range.

The node controller 011 is further configured to control the CC-NUMA system to enter a quiescent state, where the quiescent state is used to indicate that none of the processors in the CC-NUMA system sends a request to the directory memory 012, and all the processors receive responses to all requests that have been sent.

The node controller 011 is further configured to clear the record stored in the directory memory to zero, and control, after the zero clearing is completed, the CC-NUMA system to exit the quiescent state.

Optionally, the node 01 further includes a correctable error calculator 0121, where the correctable error calculator 0121 may be configured to calculate the quantity of the bits of the correctable error of the directory stored in the directory memory 012.

Correspondingly, the node controller 011 may further be configured to acquire the quantity of the bits of the correctable error from the correctable error calculator 0121, and compare the acquired quantity of the bits of the correctable error with the preset threshold.

It should be noted that, exemplarily, the correctable error calculator 0121 may be located in the directory memory 012, as shown in FIG. 3, and whether the correctable error calculator 0121 is located in the directory memory 012 is not limited in the present invention.

Optionally, the node controller 011 may be specifically configured to:

when the quantity of the bits of the correctable error of the directory stored in the directory memory 012 is greater than the preset threshold, send an interrupt instruction to the CC-NUMA system by using an operating system, where the interrupt instruction is used to instruct all the processors in the CC-NUMA system to write the dirty data in the corresponding cache back to the corresponding main memory, flush the dirty data, and directly flush the clean data in the corresponding cache.

Optionally, the node controller 011 may be specifically configured to: after the interrupt instruction is sent to the CC-NUMA system by using the operating system, send a pause instruction to the CC-NUMA system by using the operating system, where the pause instruction is used to instruct the CC-NUMA system to enter the quiescent state.

This embodiment of the present invention provides a node, including a directory memory and a node controller, where the directory memory is configured to store a record that data in the node is cached by a processor in another node in the CC-NUMA system except the node, and the node controller is configured to: when a quantity of bits of a correctable error of a directory stored in the directory memory is greater than a preset threshold, control all processors in the CC-NUMA system to write dirty data in a corresponding cache back to a corresponding main memory, flush the dirty data, and directly flush clean data in the corresponding cache; and then control the CC-NUMA system to enter a quiescent state, clear the record stored in the directory memory to zero, and control, after the zero clearing is completed, the CC-NUMA system to exit the quiescent state. The processing method can flush error bits available in the directory memory without resetting the CC-NUMA system, thereby effectively reducing a possibility of a breakdown of the CC-NUMA system caused by accumulation of the error bits in the directory memory of the CC-NUMA system.

In the several embodiments provided in the present application, it should be understood that the disclosed node and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the device and system in the embodiments of the present invention may be integrated into one processing unit, or each of the units may exist alone physically, or two or more units are integrated into one unit. The foregoing unit may be implemented in a form of hardware, or may be implemented in a form of hardware in addition to a software functional unit.

All or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing an error directory of a node in a Cache Coherence Non-Uniform Memory Access (CC-NUMA) system, comprising:
   when a quantity of bits of a correctable error of a directory stored in a directory memory of the node is greater than a preset threshold, controlling all processors in the CC-NUMA system to write dirty data in a corresponding cache back to a corresponding main memory, flush the dirty data, and directly flush clean data in the corresponding cache;
   controlling the CC-NUMA system to enter a quiescent state, wherein the quiescent state is used to indicate that none of the processors in the CC-NUMA system sends a request to the directory memory, and all the processors receive responses to all requests that have been sent; and
   clearing a record stored in the directory memory to zero, and controlling, after the zero clearing is completed, the CC-NUMA system to exit the quiescent state.

2. The method according to claim 1, further comprising: acquiring the quantity of the bits of the correctable error from a correctable error calculator of the node; and comparing the acquired quantity of the bits of the correctable error with the preset threshold.

3. The method according to claim 1, wherein the controlling all processors in the CC-NUMA system to write dirty data in a corresponding cache back to a corresponding main memory, flush the dirty data, and directly flush clean data in the corresponding cache comprises:
   sending an interrupt instruction to the CC-NUMA system by using an operating system, wherein the interrupt instruction is used to instruct all the processors in the CC-NUMA system to write the dirty data in the corresponding cache back to the corresponding main memory, flush the dirty data, and directly flush the clean data in the corresponding cache.

4. The method according to claim 3, wherein the controlling the CC-NUMA system to enter a quiescent state comprises:
   sending a pause instruction to the CC-NUMA system by using the operating system, wherein the pause instruction is used to instruct the CC-NUMA system to enter the quiescent state.

5. The method according to claim 1, wherein the preset threshold is inversely proportional to a failure rate of the directory memory, wherein the failure rate of the directory memory refers to a proportion of error bits in the directory stored in the directory memory within a preset time range.

6. A node in a cache coherence non-uniform memory access (CC-NUMA) system, comprising:
   a directory memory, configured to store a record that data in the node is cached by a processor in another node in the CC-NUMA system except the node; and
   a node controller, configured to: when a quantity of bits of a correctable error of a directory stored in the directory memory is greater than a preset threshold, control all processors in the CC-NUMA system to write dirty data in a corresponding cache back to a corresponding main memory, flush the dirty data, and directly flush clean data in the corresponding cache, wherein
   the node controller is further configured to control the CC-NUMA system to enter a quiescent state, wherein the quiescent state is used to indicate that none of the processors in the CC-NUMA system sends a request to the directory memory, and all the processors receive responses to all requests that have been sent; and
   the node controller is further configured to clear the record stored in the directory memory to zero, and control, after the zero clearing is completed, the CC-NUMA system to exit the quiescent state.

7. The node according to claim 6, further comprising:
   a correctable error calculator, configured to calculate the quantity of the bits of the correctable error of the directory stored in the directory memory, wherein
   the node controller is further configured to acquire the quantity of the bits of the correctable error from the correctable error calculator, and compare the acquired quantity of the bits of the correctable error with the preset threshold.

8. The node according to claim 6, wherein the node controller is configured to:
   when the quantity of the bits of the correctable error of the directory stored in the directory memory is greater than the preset threshold, send an interrupt instruction to the CC-NUMA system by using an operating system, wherein the interrupt instruction is used to instruct all the processors in the CC-NUMA system to write the dirty data in the corresponding cache back to the corresponding main memory, flush the dirty data, and directly flush the clean data in the corresponding cache.

9. The node according to claim 8, wherein the node controller is configured to:
after the interrupt instruction is sent to the CC-NUMA system by using the operating system, send a pause instruction to the CC-NUMA system by using the operating system, wherein the pause instruction is used to instruct the CC-NUMA system to enter the quiescent state.

10. The node according to claim 6, wherein the preset threshold is inversely proportional to a failure rate of the directory memory, wherein the failure rate of the directory memory refers to a proportion of error bits in the directory stored in the directory memory within a preset time range.

* * * * *